United States Patent [19]
Ross et al.

[11] Patent Number: 6,026,390
[45] Date of Patent: Feb. 15, 2000

[54] COST-BASED MAINTENANCE OF MATERIALIZED VIEWS

[75] Inventors: Kenneth A. Ross, New York, N.Y.; Divesh Srivastava, New Providence, N.J.; Sundararajarao Sudarshan, Mumbai, India

[73] Assignees: AT&T Corp; Columbia University, both of New York, N.Y.

[21] Appl. No.: 08/890,194

[22] Filed: Jul. 9, 1997

Related U.S. Application Data

[63] Continuation of application No. 08/760,795, Dec. 3, 1996, abandoned, which is a continuation of application No. 08/682,492, Jul. 17, 1996, abandoned

[60] Provisional application No. 60/015,864, May 29, 1996.

[51] Int. Cl.[7] ................................................. G06F 17/30
[52] U.S. Cl. ........................ 707/2; 707/1; 707/3; 707/4; 707/5; 707/6; 707/7
[58] Field of Search .................................. 707/1, 2, 3, 4, 707/5, 6, 7

[56] References Cited

U.S. PATENT DOCUMENTS

| | | | |
|---|---|---|---|
| 5,535,385 | 7/1996 | Griffin | 707/1 |
| 5,544,355 | 8/1996 | Chaudhuri | 707/1 |
| 5,598,559 | 1/1997 | Chaudhuri | 707/2 |
| 5,606,690 | 2/1997 | Hunter | 707/5 |
| 5,644,763 | 7/1997 | Roy | 707/101 |
| 5,822,749 | 10/1998 | Agarwal | 707/2 |
| 5,878,421 | 3/1999 | Ferrel | 707/100 |
| 5,897,632 | 4/1999 | Dar | 707/2 |
| 5,907,837 | 5/1999 | Ferrel | 707/3 |

*Primary Examiner*—Thomas G. Black
*Assistant Examiner*—Diane D. Mizrahi

[57] ABSTRACT

A method of incrementally maintaining a first materialized view of data in a database, by means of an additional materialized view, first determines whether a cost in time of incrementally maintaining the first materialized view with the additional materialized view is less than the cost of incrementally maintaining the first materialized view without the additional materialized view. The method creates the additional materialized view only if the cost in time is less therewith. Determining whether the cost of employing an additional materialized view is less includes using an expression directed acyclic graph that corresponds to the first materialized view. Another method of determining whether the cost is less includes pruning an expression directed acyclic graph to produce a single expression tree, and using the single expression tree to determine whether the cost is less. Both the expression directed acyclic graph and the single expression tree contain equivalence nodes. One or more possible materialized views are selected by marking the equivalence nodes, and materializing one or more views corresponding to the marked equivalence nodes. One or more possible materialized views are also selected by determining which of the views, if materialized, would result in a lowest cost of incrementally maintaining the first materialized view. The method is also used to reduce the cost in time of maintaining a first materialized view employed to check an integrity constraint of the database.

25 Claims, 4 Drawing Sheets

Query Optimization

View Maintenance

FIG. 3
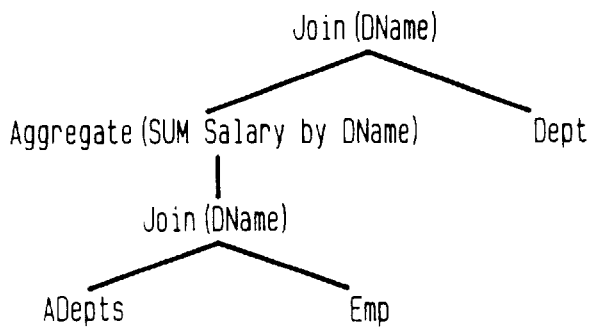
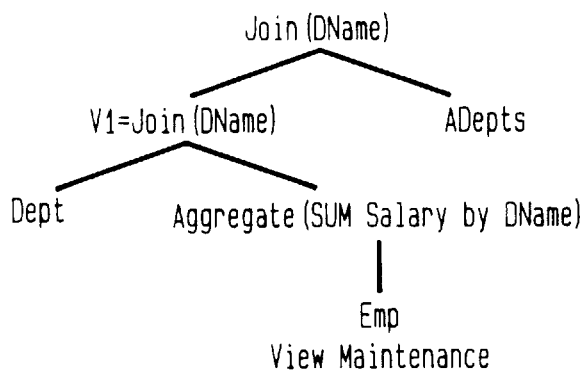
Query Optimization
View Maintenance
FIG. 5
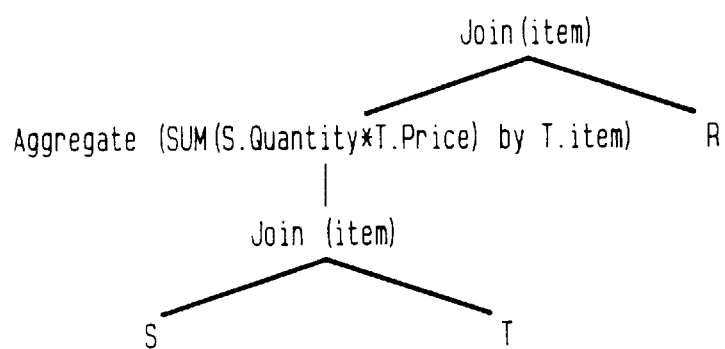

FIG. 4

```
Algorithm OptimalViewSet (V) {
/* compute cost of performing updates */
for each equivalence node N of D_V
    for each transaction type T,
        calculate the update cost for N and store in M[N,j];

c^opt=∞;
/* compute weighted total cost for each view set, and compare with best so far */
for each possible view set V{
    for each transaction type T, {
        compute the total update cost m, for all members of V; /* m, computation uses M[*,j] */
        find the update track from the marked nodes to the leaves with minimum total accumulated
        query cost q, along the update track; /* q, computation utilizes multi-queryoptimization */
        associate with V the cost q,+m, for updates to transactions of type t,;
    }
    calculate the weighted cost c for V according to the weights f, for each T,;
    if (c<c^opt) then {V^opt=V,C^opt=c;}
}
}
```

COST-BASED MAINTENANCE OF MATERIALIZED VIEWS

RELATED APPLICATION

This application is a continuation of abandoned application Ser. No. 08/760,795, filed on Dec. 3, 1996, which was a continuation of abandoned application Ser. No. 08/682,492, filed on Jul. 17, 1996, which claims benefit of Provisional application 60/015,864, filed May 29, 1996.

TECHNICAL FIELD

This invention relates generally to the field of database management systems. More particularly, the invention provides a method for reducing the cost of incrementally maintaining one or more materialized views of data in a database (i.e., sets of stored data derived from the base relations of a database).

BACKGROUND OF THE INVENTION

In a database management system, data is often maintained and presented to end users as views. Views are derived data that can be stored (materialized) in a database for subsequent querying. The base relations (or tables) of the database are used to compute views. However, recomputing views after updates to the base relations can be very expensive.

Numerous strategies have been derived for handling the maintenance of materialized views. Generally, two; basic approaches are used. The first and most obvious is to rematerialize the view using the data of the base relations which compute it. The second method is to maintain a differential file, or set of tables, and process only changes to the base relations since the last view update.

View maintenance has been studied extensively in the literature for various view definition languages, e.g., Select-Project-Join (SPJ) views, views with multiset semantics, views with grouping/aggregation, and recursive views; for various types of updates, e.g., insertions, deletions, modifications, to the database relations; and for modifications to the view definition itself.

The problem of determining which additional views to materialize, in order to reduce the cost of view maintenance, has been studied in the context of rule-based systems based on the RETE, TREAT and A-TREAT models. These models are based on discrimination networks for each rule (view); the RETE model materializes selection and join nodes in the network, while the TREAT model materializes only the selection nodes. The A-TREAT model chooses (for a fixed discrimination network) nodes to materialize using a selectivity based heuristic. Some have chosen a discrimination network and nodes to maintain, using "profitability" heuristics. Similar issues have been studied earlier in the context of maintaining integrity constraints. However, none of the above has explored how to choose the best set of materialized views (the best choice of discrimination network and the nodes to be maintained in it) in a truly cost-based manner.

The supplementary relations used in the bottom-up evaluation of recursive queries can also be viewed as additional materialized views that are maintained (during query evaluation) in order to efficiently maintain the view relations defining the original query. However, supplementary relations are introduced as part of a query rewriting step and do not take cost into consideration. They may be introduced when they are not required for efficient view maintenance, or not be introduced even when they are useful for efficient view maintenance.

None of the prior art methods solve the problem of reducing the cost of maintaining a materialized view after a change to the database by materializing additional views, or teach a method for finding the best set of views to materialize.

SUMMARY OF THE INVENTION

The present invention solves the problem of incremental maintenance of materialized views in the face of database updates, and provides a reduction in the total time cost of view maintenance by materializing (and maintaining) additional views.

Given a materialized view V, there are several possible views that can be additionally materialized and used for the incremental maintenance of V. The present invention determines which additional views should be materialized as an optimization problem over the space of possible view sets, including the empty set. The method of the present invention works under any cost optimization model.

The present invention contemplates the making of a cost-based choice for using materialized views to optimize the management of database systems. The present invention is, therefore, particularly important in a large database environment. Moreover, the invention is important for the efficient checking of assertions (complex integrity constraints) in the SQL-92 standard, since the incremental checking of such integrity constraints is known to be essentially equivalent to the view maintenance problem. Also, cost-effective view maintenance has applications in index maintenance in object-oriented databases, persistent queries, and active databases (a rule may fire when a particular table is inserted into a view).

The view maintenance optimization problem is harder than query optimization since it has to deal with multiple view sets, updates of multiple relations, and multiple ways of maintaining each view set for each updated relation. An exhaustive memoing technique is provided to solve the optimization problem. A preferred embodiment of the invention uses the expression directed acyclic graph (DAG) representation created by rule-based optimizer generators, such as Volcano™, to implement the memoing technique.

The invention also introduces a principle of local optimality that allows problem solutions for subexpressions of the expression DAG to be combined to determine the solution for the top-level view. In a preferred embodiment of the invention, under the applicable conditions, based on the expression DAG representation, this principle can be used to restrict the size and complexity of the search space, and thereby reduce the cost of optimization.

The invention also contemplates that a number of heuristics may be used to prune the search space. The heuristic techniques proposed are still cost-bas, but are less expensive than the exhaustive method of the preferred embodiment since they do not explore some parts of the full search space.

BRIEF DESCRIPTION OF THE DRAWINGS

In the drawings,

FIG. 3 illustrates two trees for Example 3.1.

FIG. 4 describes the algorithm OptimalViewSet, which embodies the inventive method of determining the set of additional materialized views which are used for view maintenance;

FIG. 5 shows articulation nodes; and

DETAILED DESCRIPTION

Figure 1:
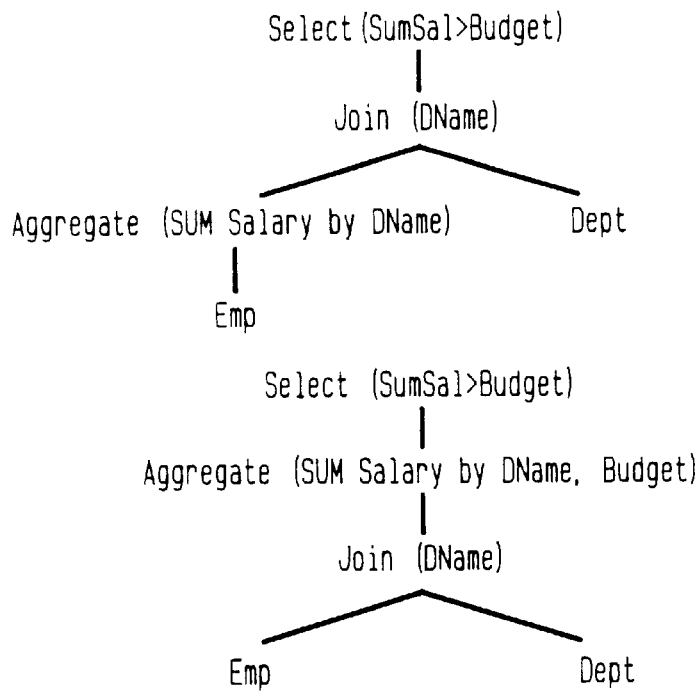
FIG. 1 illustrates two trees for the view ProblemDept of Example 1.1.

Given a materialized view defined using database relations, the problem is to determine the changes to the materialized view when the underlying database relations are updated, and update the materialized view accordingly.

In accordance with the invention, given a materialized view V to be maintained, it is possible to reduce the time cost of view maintenance by materializing (and maintaining) additional views. Obviously there is also a time cost for maintaining these additional views, but their use can often significantly reduce the cost of computing the updates to V, thereby reducing the total cost The present invention provides a solution for the following problem:

Given a materialized view V, what additional views should be materialized (and maintained) for the optimal incremental maintenance of V?

The present invention is also useful to solve the different but related problem of optimizing integrity constraint checking. The SQL-92 standard permits the specification of complex integrity constraints (also called assertions). These integrity constraints have to be checked on updates to the underlying database relations; hence it is very important that they be checked efficiently. Integrity constraints can be modeled as materialized views whose results are required to be empty. The results are particularly important for the efficient checking of SQL-92 assertions.

The following example illustrates the benefits of the inventive method for maintaining additional materialized views to improve the efficiency of maintenance of materialized views and checking of complex integrity constraints.

Example 1.1
(Additional Materialized Views)

Consider a corporate database with two base relations:
Dept (DName, MName, Budget), which gives the manager and budget for each department, and
Emp (EName, DName, Salary), which gives the department and the salary of each employee.

Consider the materialized view, ProblemDept:

| CREATE VIEW | ProblemDept (DName) AS |
|---|---|
| SELECT | Dept.DName |
| FROM | Emp, Dept |
| WHERE | Dept.DName = Emp.DName |
| GROUPBY | Dept.DName, Budget |
| HAVING | SUM(Salary) > Budget |

This view determines those departments whose expense (i.e., the sum of the salaries of the employees in the department) exceeds their budget. When the database relations Emp and Dept are updated, view maintenance of a ProblemDept, even using incremental techniques, can be expensive. For example, when a new employee is added to a department that is not in ProblemDept, or the salary of an employee in such a department is raised, the sum of the salaries of all the employees in that department needs to be recomputed and compared with the department's budget; this can be expensive.

The view ProblemDept can also be used to specify the integrity constraint "a department's expense should not exceed its budget", by requiring that ProblemDept be empty. This can be specified in SQL-92 as follows:

CREATE ASSERTION DeptConstraint CHECK (NOT EXISTS (SELECT * FROM ProblemDept))

The efficiency of incremental view maintenance of the view ProblemDept (and therefore also the efficiency of checking the integrity constraint DeptConstraint) can be considerably improved if the view SumOfSals below, is additionally kept materialized.

| CREATE VIEW | SumOfSals (DName, SalSum) AS |
|---|---|
| SELECT | Dname, SUM(Salary) |
| FROM | Emp |
| GROUPBY | DName |

When new employees are added, existing employees are removed, or salaries of existing employees are modified, efficient incremental view maintenance of SumOfSals is possible by adding to or subtracting from the previous aggregate values. View ProblemDept can also be efficiently maintained by performing a natural join of the changed tuples of view SumOfSals with the Dept relation (on DName), and checking whether the newly computed sum of salaries exceeds the department's budget. Similarly, when a department's budget is modified, the changed tuple of the Dept relation can be joined with the materialized view SumOfSals for efficient view maintenance of ProblemDept. This improved efficiency of view maintenance of ProblemDept comes at the expense of:

additional space to represent SumOfSals, and
additional time to maintain SumOfSals.

When the time cost of maintaining SumOfSals is less than the time benefit of using SumOfSals for maintaining ProblemDept, the overall time cost of view maintenance as well as integrity constraint checking is reduced. On a sample date, various embodiments of the invention have achieved a greater than threefold decrease in estimated materialization cost by maintaining the additional view SumOfSals. Thus maintaining a suitable set of additional materialized views can lead to a substantial reduction in maintenance cost.

Expression Trees and DAGs

One aspect of the invention is a method for determining what views to additionally materialize (and maintain) using expression trees and expression DAGs developed for performing cost-based query optimization although the problem of query optimization is quite different from the problem solved by the present invention.

An expression tree for a query or view V is a binary tree; each leaf node corresponds to a database relation that is used to define V; each non-leaf node contains an operator, and either one or two children; the algebraic expression computed by the root node is equivalent to V. When the trees have common subexpressions, they are called directed acyclic graphs, or DAGS. Expression trees are often used in query optimizers to determine the cost of a particular way of evaluating the query. The inventive principles are independent of the actual set of operators. The present invention contemplates operators from an extended relational algebra, that includes duplicate elimination and grouping/aggregation, in addition to the usual relational operators.

Expression DAGs are used by rule-based optimize such as Volcano™ to compactly represent the space of equivalent expression toes as a directed acyclic graph. An expression DAG is a bipartite directed acyclic graph with "equivalence" nodes and "operation" nodes. An equivalence node has edges to one or more operation nodes. An operation node contains an operator, either one or two children that are equivalence nodes, and only one parent equivalence node. An equivalence node is labeled by the algebraic expression it computes; operation nodes correspond to various expression trees that give a result that is algebraically equivalent to the label of the parent equivalence node. The leaves of an expression DAG are equivalence nodes corresponding to database relations.

An important aspect of an expression DAG is its similarity to an AND/OR tree. An equivalence node can be "computed" by computing one of its operation node children. An operation node can be computed only by computing all of its equivalence node children. Given an expression tree for the query, rule-based query optimizers generate an expression DAG representation of the set of equivalent expression trees and subexpressions trees by using a set of equivalence rules, sting from the given query expression tree.

Example 2.1

Two expression trees for the view ProblemDept of Example 1.1 are given in FIG. 1. The expression DAG representation of those trees is given in FIG. 2. The bold nodes Ni are equivalence nodes, and the remaining nodes are operation nodes. In practice, an expression DAG would represent a much larger number of trees; a small example is used for simplicity of presentation.

Incremental Updating of Expression Trees

Materialized views can be incrementally maintained when the underlying database relations are updated using any of several well-known prior art techniques for updating a materialized view using differential files. The basic idea is to use differentials $\Delta R_i$ for each relation $R_i$ that is updated, and compute the differential $\Delta V$ for a materialized view V as an expression involving the updates to the database relations ($\Delta R_i$) the state of the database relations prior to the updates ($R_i^{old}$), and the state of the materialized view prior to the updates ($V^{old}$).

The present invention contemplates differentials that include inserted tuples, deleted tuples, and modified tuples.

To compute the differential $\Delta$ on the result of an operation, queries may have to be set up on the inputs to the operation. Consider, for example, a node N for the operation $E_1 \bowtie_\theta E_2$, and suppose an update $\Delta E_1$ is propagated up to node N. When N is not materialized, in order to compute the update to the result of a $E_1 \bowtie_{\theta 4} E_2$, a query has to be posed to $\Delta E_2$ asking for all tuples that match $E_1$ on the join attributes; informally, this set of tuples can be defined as $E_{2\ \theta} \Delta E_1$.

When $E_2$ is a database relation, or a materialized view, a lookup is sufficient; in general the query must be evaluated. The case where both inputs to the join have been updated can be handled by a simple extension of the above scheme. Similar techniques apply for other operations, such as selection, projection, aggregation, duplicate elimination, union, intersection, difference, etc.

Given updates to the database relations at the leaves of the tree, the update to the result of an expression tree can be computed by starting from the updated database relations and propagating the updates all the way up to the root of the tree one node at a time. At each node, the update to the result of the node is computed from the updates to the children of the node. Given one or more database relations that are updated, the set of affected nodes in the tree are those that have an updated relation as a descendant.

At each operation node where an update is computed, there is a $\Delta$ on one or more of the inputs to the operation. Assuming that the sizes of the $\Delta$ on the inputs are available, and given statistics about the inputs to an operation, it is possible to compute the size of the update to the result of the operation can be computed, for each of the above operations. The techniques of the present invention are independent of the exact formulae for computing the size of the $\Delta$, although the examples have used specific formulae.

Exhaustive Enumeration of Inventive Method

Given a materialized view V, it may be worthwhile materializing and maintaining additional views, as illustrated in Example 1.1. In general there are several possible views that can be additionally materialized and used for the incremental maintenance of V. For example, suppose it is necessary to maintain the SPJ view $R_1 \bowtie R_2 \bowtie R_3$. There are several choices of sets of additional views to maintain, namely, $\{R_1 \bowtie R_2\}$, $\{R_2 \bowtie R_3\}$, $\{R_1 \bowtie R_3\}$, $\{R_1 \bowtie R_2, R_2 \bowtie R_3\}$, $\{R_2 \bowtie R_3, R_1 \bowtie R_3\}$, $\{R_1 \bowtie R_2, R_1 \bowtie R_3\}$. Different choices may have different costs associated with them. The following describes an exhaustive approach to the problem of determining the optimal set of additional views to materialize.

Consider a database with the relations Dept and Emp of Example 1.1, and an additional relation ADepts (DName), which gives the departments of type A. Let ADeptsStatus (DName, Budget, SumSal) be the view defined by the following query:

| | |
|---|---|
| SELECT | Dept.DName, Budget, SUM(Salary) |
| FROM | Emp, Dept, ADepts |
| WHERE | Dept.DName = Emp.DName AND |
| | Emp.DName = ADepts.DName |
| GROUPBY | Dept.DName, Budget |

A likely plan for evaluating ADeptsStatus, when treated as a query, is the tree labeled "Query Optimization" in FIG. 3, if the number of tuples in ADepts is small compared to the number of tuples in Dept.

When ADeptsStatus is a materialized view that has to be maintained under updates only to the relation ADepts, the cost of processing updates would be reduced significantly by materializing the view defined by V1 in the tree labeled "View Maintenance" in FIG. 3. This is because an update to ADepts only needs to look up the matching tuple in V1 to incrementally maintain ADeptsStatus, whereas if V1 were not maintained, a query would have to be invoked on V1 to compute the matching tuples. Since there are no updates to the relations Dept. and Emp, view V1 does not need to be updated. In this example, {V1} is likely to be the optimal set of additional views to maintain.

If there were updates on the relations Dept and Emp, the cost of maintaining view V1 would have to be balanced against the benefit of using V1 to process updates on ADepts. Based on the cost of propagating updates, an optimal set of additional views to maintain has to be chosen.

Note also that the expression tree used for prosing updates on a view can be quite different from the expression tree used for evaluating the view (as a query), as illustrated in this example. Hence, the optimal expression tree for evaluating the view cannot be used order to propagate updates.

Search Space of Views

In accordance with the principles of the present invention, the search space of views may be defined as the set of candidate view sets to be considered for possible additional materialization.

Let $D_v$ denote the expression DAG obtained from a materialized view V by using a given set of equivalence rules, and a rule-based optimizer, such as Volcano™. The first step in determining the additional views to materialize for efficient incremental maintenance of V is to generate $D_v$. The root node V will be materialized and the leaf nodes correspond to database relations, which are already materialized.

Second, let $E_v$ denote the set of all equivalence nodes in $D_V$, other than the leaf nodes. A candidate view set is a subset of $E_V$.

The search space of possible views to materialize is the set of all subsets of $E_V$ that include the equivalence node corresponding to V.

It will be recognized that a materialized view V needs to be maintained. The set of additional materialized views to maintain is M (where $M \subset E_v$, and $V \in M$). Each additional view in M is thus a subexpression of an expression algebraically equivalent to V. The views in M\{V} are the additional views that are maintained in order to reduce the total cost of view maintenance.

Each materialized view (including V) corresponds to a distinct equivalence node in $D_V$; hence these equivalence nodes can be "marked" to indicate their materialization status. The equivalence nodes corresponding to the database relations may also be considered "marked".

Update and Query Cost Models

It is as d that a set of transaction types $T_1, T_2, \ldots, T_n$ will update the database, where each transaction type defines the relations that are updated, the kinds of updates (insertions, deletions, modifications) to the relations, and the size of the update to each of the relations. It is also assumed that each of the transaction types $T_i$ will have an associated weight $f_i$ that reflects the relative frequency of the transaction type, or the relative importance of efficiently maintaining view V when that transaction is executed.

Given a view V, a transaction type $T_i$, and M, as the set of views to be maintained, it will be recognized that would be inefficient to compute the updates to each view in M independently, because they have a lot of commonality and updates to one can be used to compute updates to others. One aspect of the invention contemplates maintaining a set of views M based on the expression DAG $D_V$ of V. The inventive approach thereby takes into account the possibility of shared computation between the update computations for the different materialized views in M.

For each transaction type $T_i$, database relation updates are propagated up the expression DAG.

In order to propagate database relation updates up an expression DAG, additional queries may need to be posed for many of the operations. When updates are propagated up the nodes of the expression DAG, the inputs to an operation node are equivalence nodes; queries are thus posed on equivalence nodes. A query on an equivalence node can be evaluated using any of the operation nodes that are the children of the equivalence node; they all generate the same result, but can have different costs.

Each transaction type defines the database relations that are updated. Given a transaction type, one can go up the expression DAG, starting from the updated relations, determining the queries that need to be posed at each equivalence node. The straight forward details of this process are omitted. Since each query is generated by an operation node, the query can be identified by the operation node that generates it, the child on which it is generated, and the transaction type.

Example 3.2

Below are the queries that may need to be posed. In each case, the queries are labeled by the number of the operation node and "L" or "R", if the node has two operands, to denote whether the query is on the left operand, or the right operand.

Example 3.2 contemplates two transactions, one which modifies the Salary of Emp tuples and one which modifies the Budget of Dept tuples. The queries are further labeled with "e" or "d" to denote whether relation Emp or Dept was updated (i.e., to identify the transaction that generates the query).

Q2Ld: At E2, find the sum of salaries of the department(s) that have been updated.

Q2Re: At E2, find the matching Dept tuple of the department whose sum of salaries has changed.

Q3e, Q3d: At E3, find the sum of salaries of the department (s) of the updated join tuple(s).

Q4e: At E4, find the sum of salaries of the department(s) from which the updated Emp tuple(s) came.

Q5Ld: At E5, find the employees of the updated Dept tuple(s).

Q5Re: At E5, find the matching Dept tuple of the updated Emp tuple(s).

Relevant Parts of the Expression DAG

Given a materialized view V and a given set T of transaction types $T_1, T_2, \ldots, T_n$, the cost of maintaining a given set of views M for a given a transaction type $T_i$ must be determined.

To maintain M, updates must be propagated up the expression DAG from updated database relations to every materialized view in M. However, it is not necessary to propagate an update along every path up the DAG, since each operation node below an equivalence node will generate the same result, and only one need be chosen to propagate the update. Update tracks, described below, make precise the different minimal ways of propagating updates up an expression DAG to maintain a set of materialized views M, given a transaction type $T_i$.

First, the present invention introduces the concept of a subdag of an expression DAG, which identifies the different ways of propagating updates up the expression DAG to the set of views M, independent of the specific database relations updated by the transaction type.

Definition of Subdags

Given an expression DAG $D_V$ and a set M of equivalence nodes in $D_V$, a subdag of $D_V$ containing M is any subset of the DAG $D_V$ satisfying the following properties:

each equivalence node in M is in the subdag.

for each non-leaf equivalence node in the subdag, exactly one of its child operation nodes is in the subdag.

for every operation node in the subdag, each of its child equivalence nodes is in the subdag.

no other nodes are in the subdag.

edges in $D_V$ connecting the nodes in the subdag are edges in the subdag.

SubDags ($D_V$, M) denotes the set of all subdags of $D_V$ containing M.

The intuition behind subdags is that it suffices for each equivalence node to compute its update using one of its child operation nodes; computing updates using other child operation nodes at the same time would be redundant. So would computing updates to nonmaterialized equivalence nodes used only in operation nodes that are themselves not used.

Subdags are a generalization of the concept of using an expression tree to handle multiple materialized views. If M contains only the view V, a subdag is merely any expression tree represented by the DAG, rooted at the equivalence node corresponding to the view V. Just as the set of all expression trees represented by an expression DAG for a single query is the set of all ways to compute the query, the set of all subdags of a DAG defines the set of all ways of computing a set of queries (or materialized views, in our case).

Moreover, in the present invention each way of computing the materialized views corresponds to a way of propagating updates to the materialized views. Hence the set of subdags SubDags ($D_v$, M) also defines the set of all ways of propagating updates to the materialized views.

If the expression DAG $D_v$ of V has nodes that do not have any descendant nodes updated by transactions of a given type, updates need not be propagated up to these nodes.

Definition of Update Track

Consider a marked expression DAG Dv for view V with the set of marked nodes being M, and a transaction of type $T_i$. Let $U_V$ denote the subset of equivalence and operation nodes of $D_v$ whose results are affected by transactions of type $T_i$. Given any subdag $S_D$ of $D_v$ including M, the subset of $S_D$ consisting of affected nodes and the edges between them in $S_D$ is an update track of $D_v$ for transactions of type $T_i$.

Given an update track $S_D$ as above, and a set of updates to database relations by a transaction of type $T_i$, the updates can be propagated up the nodes of the update track At each node, the update to the result is computed based on the updates to its inputs using any of the various prior art incremental update techniques.

Cost of Maintaining a Set of Views

One embodiment contemplates the time cost of maintaining a set of views M for a given transaction type $T_i$. There are multiple update tracks along which updates by transactions of type $T_i$ can be propagated; these could have different costs. The cost of propagating updates along a single update track will now be addressed. This cost can be divided into two costs: (a) computing the updates to the various nodes in the update track, and (b) performing the updates to the views in M.

Cost of Computing Updates

The computation of updates to nodes in an update track poses queries that can make use of the other materialized views in M (which is the reason for maintaining additional views). Determining the cost of computing updates to a node in an update track in the presence of materialized views in M is this reduced to the problem of determining the cost of evaluating a query Q on an equivalence node in $D_v$, in the presence of the materialized views in M. This is a standard query optimization problem, and the various prior art optimization techniques can be easily adapted for this task.

When propagating updates along an update track, many queries may need to be posed. This set of queries can have common subexpressions, and multi-query optimization techniques can be used for optimizing the evaluation of the collection of queries. Shared work between the queries could lead to locally nonoptimal plans being globally optimal. Note that the presence of common subexpressions in the expression DAG influence a solution to the problem of determining what additional views to materialize in two distinct ways:

First, subexpressions can be shared between different views along a path for propagating updates. The notions of subdags and update tracks were used to deal with such subexpressions.

Second, subexpressions can be shared between different queries generated along a single update track. Multi-query optimization is used to deal with such subexpressions.

The techniques and results of the present invention are applicable for any cost model for evaluating the queries. The exact way of determining the cheapest way of evaluating the set of queries generated, and computing their costs requires a plan for computing the updates. The plan chosen for computing the updates will be determined by the cost model used.

Cost of Performing Updates to M

The cost of materializing a view also includes the cost of performing updates to the materialized view. The cost of performing updates depends on the physical storage model, including the availability of suitable indices (which must themselves be updated too). The cost also depends on the size of the incoming set of updates, that is, the size of the "delta", or differential relations. The size can be estimated from the transaction type, and the definition of the deltas; the actual size is independent of the way the delta relations are computed.

For example, at node N4 in Example 2.1 there might be one update tuple for an update to the Emp relation, but 10 update tuples for an update to the Dept relation if the average department contains 10 employees. Another example is node N3, where the cost of materialization is zero for updates to the Dept relation. There are a number of reasonable cost models for calculating the cost of performing updates; the present invention applies no matter which is chosen.

Space Cost

In addition to the above costs, there is clearly a space cost associated with maintaining additional materialized views. There is no unique way of combining space and time costs to get a single cost; economic models based on assigning "monetary" costs to the space and time costs can be used to generate a combined cost for a view set. The present invention can work with such a combined cost.

Exhaustive Algorithm

The block diagram in FIG. 4 depicts an exhaustive algorithm, named OptimalViewSet, which embodies various aspects of the inventive method for determining the optimal set of additional views to materialize for incremental maintenance of V.

The cost of maintaining a view set M for transaction type $T_i$ is obtained as the cost of the cheapest update track that can be used for propagating updates to M; let $C(M, T_i)$ denote this cost. By weighting the cost $C(M, T_i)$ with the weight $f_i$ of transaction type $T_i$, the weighted average cost of maintaining materialized views M can be computed as:

$$C(M) = \frac{\sum_i (M, T_i) * f_i}{\sum_i f_i}$$

The optimal view set $M^{opt}$ to be materialized for maintaining V can be chosen by enumerating all possible markings of equivalence nodes of $D_V$, and choosing one that minimizes the weighted average cost. (Recall that the root equivalence node of $D_v$ is always marked.)

The optimality of OptimalViewSet naturally depends on the assumed optimality of the underlying multi-query optimization subroutine. The complexity of OptimalViewSet depends on the set of equivalence rules used, and could be doubly exponential (or more) in the number of relations participating in the view definition; clearly the algorithm is not cheap. However, the cost can be acceptable if the view uses a small number of relations, or if the inventive optimizations and heuristics are used.

Motivating Example Revisited

Figure 2:
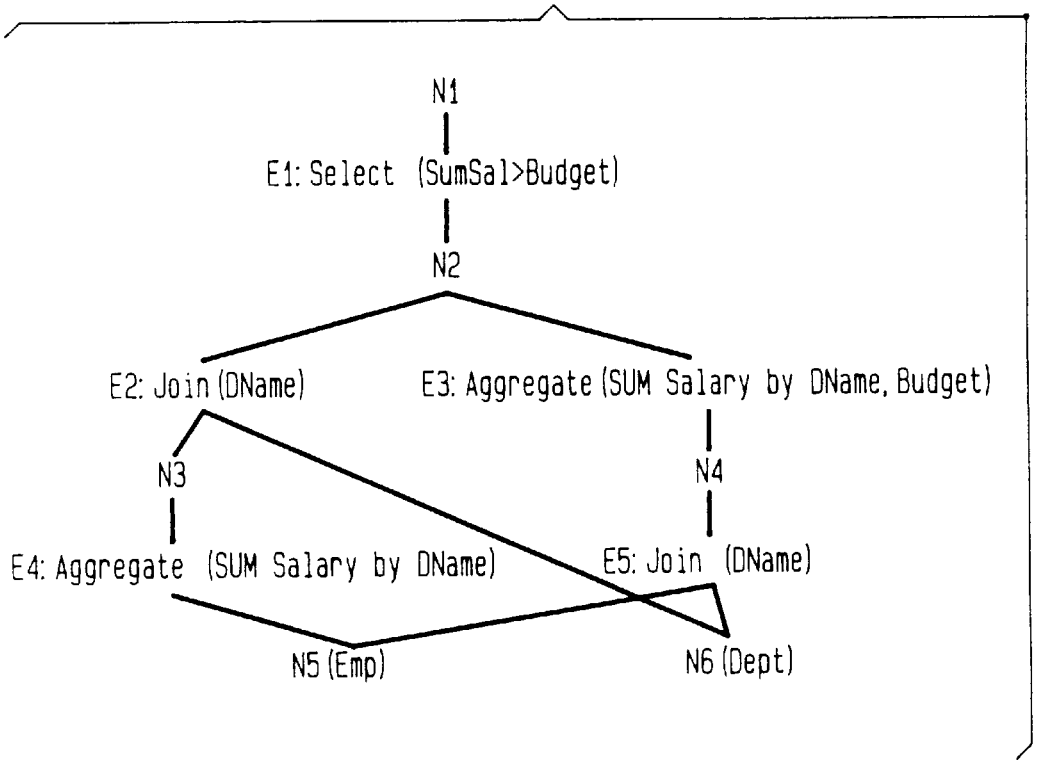
FIG. 2 illustrates an expression DAG for the trees of FIG. 1.
Figure 6:
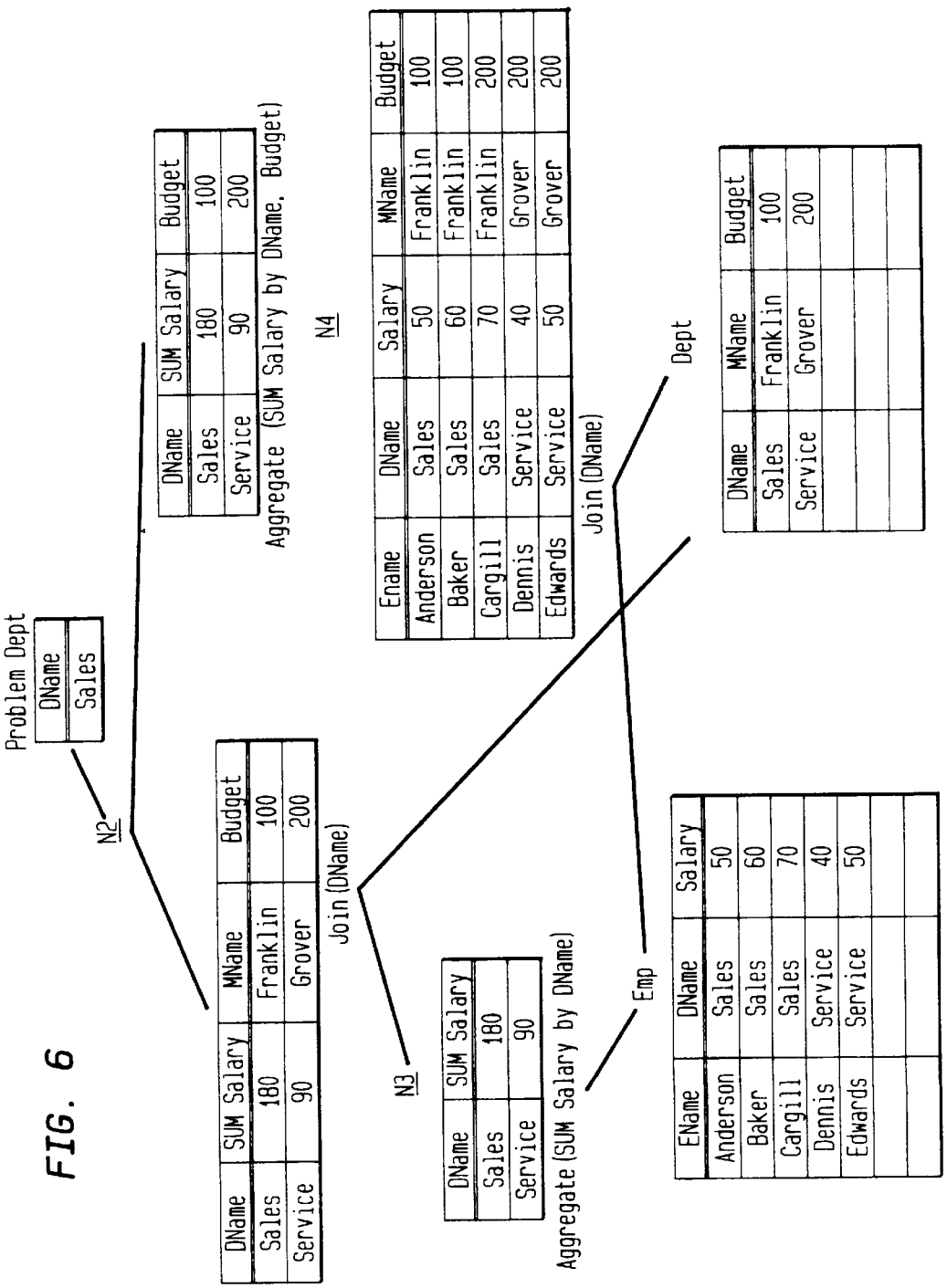
FIG. 6 provides an illustration of materialized views in a database including the first materialized view of Examples 1.1, ProblemDept, and the possible additional views N2, N3, N4.

Returning to Example 1.1, the expression trees and expression DAG are given in FIGS. 1 and 2, respectively. The subqueries generated are given in Example 3.2. For the sake of clarity, a simplified cost model describe below will be discussed. In practice, more realistic cost models would be used. It is assumed that all indices are hash indices, that there are no overflowed hash buckets, and that there is no clustering of the tuples in the relation.

In a simplified cost model, a count of the number of page I/O operations may be used. Looking up a materialized relation using an index involves reading one index page and as many relation pages as the number of tuples returned. Updating a materialized relation involves reading and writing (when required) one index page per index maintained on the materialized relation, one relation page read per tuple to read the old value, and one relation page write per tuple to write the new value.

Suppose that there are 1000 departments, 10000 employees, and a uniform distribution of employees to departments. None of the data need be memory-resident initially. There are two types of transactions: ⋈ Emp that modifies the salary of a single employee, and ⋈Dept that modifies the budget of a single department. Consider four possible additional view sets to materialize: (a) { }, (b) {N2}, (c) {N3}, and (d) {N4}. (The exhaustive algorithm of the preferred embodiment would consider all possible view sets.)

The total incremental maintenance costs of various materializations are summarized in Table 1, assuming that each of the materializations has a single index on DName. (The cost of updating the database relations, and the top-level view ProblemDept are not counted.) For example, the cost of incrementally maintaining N4} when a Dept tuple is modified involves reading, modifying and writing 10 tuples; this has a cost of 21 page I/Os (including one index page read; no index page write is necessary). Similarly, the cost of incrementally maintaining N3 when an Emp tuple is modified involves reading, modifying and writing 1 tuple; this has a cost of 3 page I/Os (again, no index page write is necessary). The cost of maintaining N4 in response to an update of an Emp tuple is 12, representing reading an index page for the given department, reading the 10 tuples of N4 with that department, and writing back the modified tuple corresponding to the changed employee.

TABLE 1

|      | { } | {N2} | {N3} | {N4} |
|------|-----|------|------|------|
| ΔEmp | 0   | 3    | 3    | 12   |
| ΔDept| 0   | 3    | 0    | 21   |

Consider the following four update tracks.

TABLE 2

| Track | Transaction | Queries |
|-------|-------------|---------|
| N1, E1, N2, E2, N3, E4, N5 | ΔEmp | Q4e, Q2Re |
| N1, E1, N2, E3, N4, E5, N5 | ΔEmp | Q5Re, Q3e |
| N1, E1, N2, E2, N6 | ΔDept | Q2Ld |
| N1, E1, N2, E3, N4, E5, N6 | ΔDept | Q5Ld, Q3d |

On each update track several queries are posed, as indicated in Table 2. Multi-query optimization on each collection of queries must be performed. Further, the optimization should take advantage of the fact that certain index and main relation pages from the materialized views are available for free (given sufficient buffer space) since those pages are needed for view maintenance anyway. The following table, Table 3, gives the total query costs for each update track.

TABLE 3

|      | { } | {N2} | {N3} | {N4} |
|------|-----|------|------|------|
| N1, E1, N2, E2, N3, E4, N5 | 13 | 0 | 2 | 0 |
| N1, E1, N2, E3, N4, E5, N5 | 13 | 0 | 2 | 0 |
| N1, E1, N2, E2, N6 | 11 | 0 | 2 | 0 |
| N1, E1, N2, E3, N4, E5, N6 | 11 | 11 | 11 | 0 |

Query Q3d can be evaluated very efficiently on the update track N1, E1, N2, E3, N4, E5, N6: Since Dname is a key for the Dept relation, the Δ result propagated up along E5 and N4 contains the tuples in the group. Thus no I/O is generated for Q3d. On this same track Q5Ld can be answered by looking up the Emp relation: since each department has an average of 10 employees, an indexed read of the Emp relation has a cost of 11 page I/Os (including one index page read). However, in the case that N4 is materialized, we can reuse the pages of N4 read for view maintenance (contributing to the maintenance cost of 21 in Table 1 above), leading to no additional query cost.

The update track N1, E1, N2, E2, N3, E4, N5 involves queries Q4e and Q2Re. Both of these queries can be answered with no additional cost when either N2 or N4 is material using the pages previously counted for maintenance. When N3 is materialized, Q4e can be answered without additional cost, but Q2Re needs two page reads to get the required tuple from Dept. When nothing is materialized, 11 pages are used for Q4e and 2 for Q2Re, a total of 13.

Table 4 below shows the results of combining the materialization and query costs, and minimizing the costs for each updated relation. For example, the cheapest way of maintaining the view set {N3} for transaction type ⋈ Emp involves using the update track N1, E1, N2, E2, N3, E4, N5 (for a cost of 2 page I/Os); the cost of maintaining N3 itself for transaction type ⋈ Emp is 3 page I/Os; the total is 5 page I/Os.

TABLE 4

|       | { } | {N2} | {N3} | {N4} |
|-------|-----|------|------|------|
| ΔEmp  | 13  | 3    | 5    | 12   |
| ΔDept | 11  | 3    | 2    | 21   |

Independent of the weighting for each transaction type, materializing {N2} or {N3} wins over not maintaining any additional views, as well as over maintaining the view set {N4}; {N3} corresponds to maintaining the view SumOfSals from Example 1.1. Maintaining {N4} is usually (depending on the transaction weights) worse than not materializing any additional views; by making a wrong choice of additional views to materialize the cost of view maintenance may be worse than materializing no additional views. The choice between materializing {N2} and {N3} can be made quantitatively on the basis of the transaction weights. If the top-level view changes rarely, because the integrity constraint is rarely violated, then by materializing {N2} an average of 3 page I/Os per transaction for maintenance are used compared with 12 when materializing no additional views, assuming an equal weight for the two transactions. That's a reduction to 25% of the cost incurred when no additional views are maintained.

Impact of Common Subexpressions

The algorithm OptimalViewSet in FIG. 4 computes the minimum cost query plan for an operation node once for every update track being considered. It would appear to be more efficient to compute the minimum cost plans only once for a given set of marked nodes, and not repeat the computation for each update track. Unfortunately, such a computation would not be correct in that it may ignore a globally optimal plan for propagating updates that is composed of plans that are not locally optimal. Locally suboptimal plans may be part of a globally optimal plan due to the costs of common subexpressions being amortized by multiple uses.

Common subexpressions between two views in the view set M can arise because the view V itself had common subexpressions. Even when V itself does not have common subexpressions, it is possible for the expression DAG $D_V$ to have common subexpressions. In estimating the cost of maintaining an arbitrary view set (i.e., a set of equivalence nodes) M, a similar argument shows that suboptimal plans for maintaining individual views in M can be combined to obtain an optimal plan for maintaining M. As a consequence, it appears that there is inherently little scope for reuse of lower-level cost computations in deriving globally optimal costs.

Definition of Articulation Node

An articulation node of a connected undirected graph is a node whose removal disconnects the graph. When the expression DAG $D_v$ (viewed as an undirected graph) of a view V has equivalence nodes that are articulation nodes, it turns out that only optimal cost expression trees for the materialized subviews corresponding to articulation nodes are used in determining the optimal choice for V.

The intuition is as follows: Consider an equivalence node N that is an articulation node of $D_V$; let N1 denote any descendant equivalence node of N; and N2 denote any ancestor equivalence node of N1 that is not also a descendant of N. Then N1 can be part of an expression tree with root N2 only if N is also part of that expression tree. Consequently, the subview corresponding to node N can be optimized locally. The inventive method formalizes this concept in the principle of local optimality described below. It will be recognize that $E_V$ denotes the set of all subviews of view V. It is assumed that Opt(V) denotes the optimal subset of $E_V$ chosen for maintenance of V.

Local Optimality Principle

If V1∈ Opt(V) and the equivalence node corresponding to V1 is an articulation node of $D_V$, then Opt(V1)=Opt(V)∩ $E_{V1}$.

Given a materialized view V, the algorithm Optimal-ViewSet of FIG. 4 operated on the expression DAG $D_V$ of view V, and computed update costs and query cost separately for each update track in $D_V$. When $D_V$ has equivalence nodes that are articulatic nodes, the Local Optimality Principle can be used to considerably optimize this algorithm. For each equivalence node N in $D_V$ that is an articulation node, let $D_V$ denote the subset of $D_V$ consisting of N, its descendant nodes, and edges between them. Then, for each $D_V$ update costs and query costs can be computed for update tracks independently of (update and query) cost computations for other $D_N$'s. These costs can be directly combined to compute the update and query costs for update tracks in $D_V$. This can considerably restrict the search space that needs to be explored to obtain an optimal solution.

Articulation nodes often arise in expression DAGs of complex views, especially when the view is defined in terms of other views with grouping/aggregation Consider, for example, the expression tree in FIG. 5. The aggregation cannot be pushed down the expression tree because it needs both S.Quantity and T.Price. If Item is not a key for relation R, then the aggregation cannot be pushed up the expression tree because the multiplicities would change.

The Principle of Local Optimality embodied in the present invention has particular relevance for large database systems. Also, in accordance with the present invention, query costs can be minimized at articulation nodes.

Heuristic Pruning of the Search Space

The exhaustive approach, even with the optimizations described above, can be expensive for complex SQL views since the search space is inherently large. By the very nature of the problem, optimization does not have to be performed very often, and hence the exhaustive approach may be feasible even for complex views. If, however, the view is too complex for an exhaustive search strategy to be feasible, or the optimization time is required to be small, heuristics can be used to drastically reduce the search space. Various embodiments of the present invention use heuristics to reduce, but not eliminate the search space entirely, so that at least several different view sets are considered and the best one chosen.

Using a Single Expression Tree

One embodiment of the present invention uses a single expression tree to determine what views to additionally materialize. Using a single expression tree equivalent to V for determining a view set can dramatically reduce the search space: the number of equivalence nodes that need to be considered is smaller than in the expression DAG $D_V$ and each equivalence node has only one child operation node whose costs need to be computed. An example is to simply use the expression tree that has the lowest cost for evaluating V when treated as a query, ignoring the potential suboptimality outlined in Example 3.1.

Choosing a Single View Set

In another embodiment, a marking of the nodes of a given expression tree can be chosen heuristically. A simple heuristic is to mark each equivalence node of the tree that is the (unique) parent of operations that are expensive to compute incrementally if their result is not materialized. Examples of such operations are grouping/aggregation and duplicate elimination. Finally, the set of marked nodes can be chosen as the additional views, provided that the cost of this option is cheaper than the cost of not materializing any additional views. This approach is similar to the rationale used in TREAT, but unlike TREAT, the set of all expressions trees can still be explored to find the best.

Approximate Costing

An alternative to using the heuristics described above is based on approximate costing. One possibility is to use a greedy approach to costing, and only maintain a single update cost with each equivalence node, and a single cost with each query at an equivalence node during the exhaustive procedure, even when the equivalence node is not an articulation node of expression DAG $D_V$. The result of associating a single cost with each query, on Algorithm OptimalViewSet, is to move the query cost computation out of the inner-most loop, reduce the complexity of the algorithm.

Integrity Constraint Checking

The present invention also solves the problem of determining how to efficiently check complex integrity constraints. The problem of efficient view maintenance is especially important for implementing SQL-92 assertions. These assertions are simply queries that return true/false, and the database is required to be such that the assertions are always true. When the database is updated, it is important to check if the update will make the assertion false. An assertion can be modeled as a materialized view, and the problem then becomes one of computing the incremental update to the materialized view. While the materialized view corresponding to the root of the assertion expression must always be empty, the remaining nodes can correspond to non-empty views. Standard integrity constraint checking techniques can be used for simple assertions. However, if assertions are complex, incrementally checking them may be quite costly unless additional views are materialized, as illustrated in the motivating example Example 1.1.

Maintaining Multiple Materialized Views

The present invention can also be applied in a straightforward fashion to the problem of determining what views to additionally materialize for efficiently maintaining a set of materialized views. The key to this is the fact that the expression DAG representation can also be used to compactly represent the expression trees for a set of queries, not just a single query. The only change will be that the expression DAG will have to include multiple view definitions, and may therefore have multiple roots, and every view that must be materialized will be marked in the expression DAG.

Conclusion

The present invention solves the problem of reducing the cost of maintaining a materialized view by materializing (and maintaining) additional views, and using an exhaustive algorithm for finding the best set of views to materialize. Optimizations for the algorithm, as well as some heuristics, have been described. The techniques are important for maintaining complex SQL views and for checking complex SQL-92 assertions. The techniques are cost-based, but independent of the cost model used; any cost model can be "plugged in." The view sets chosen using (non-heuristic) techniques are optimal under the update propagation model used.

Materializing additional views has benefits beyond those addressed here. In particular, additional views may be used to speed up ad-hoc queries. Algorithm OptimalViewSet can be extended to take query benefits into account by performing an additional optimization step (given a set of queries with weights) for each possible view set, and incorporating this query cost into our total cost.

It will be recognized that the foregoing descriptions are merely illustrative of the application of the principles of the present invention. Modifications and variations of the arrangements and methods of the present invention may be practiced without departing from the scope of the invention.

We claim:

1. A method of incrementally maintaining a first materialized view of data in a database, the method employing an additional materialized view to maintain the first materialized view and the method comprising the steps of:

determining whether a first cost of incrementally maintaining the first materialized view with the additional materialized view is less than a second cost of incrementally maintaining the first materialized view without the additional materialized view; and creating the additional materialized view only if the first cost is less than the second cost.

2. The method set forth in claim 1 wherein the step of determining whether the first cost is less comprises the steps of:

making an expression directed acyclic graph corresponding to a query which produces the first materialized view; and using the expression directed acyclic graph to determine whether the first cost is less than the second cost.

3. The method set forth in claim 2 wherein the step of using the expression directed acyclic graph to determine whether the first cost is less includes the steps of:

pruning the expression directed acyclic graph to produce a single expression tree corresponding to the query; and using the single expression tree to determine whether the first cost is less than the second cost.

4. The method set forth in claim 2 wherein the step of making an expression directed acyclic graph comprises the step of making an expression directed acyclic graph containing a plurality of equivalence nodes; and the method further comprising the steps of:

marking one or more of the plurality of equivalence nodes; and selecting the additional materialized view from the marked equivalence nodes.

5. The method set forth in claim 3 wherein the pruning step comprises the step of producing a single expression tree containing a plurality of equivalence nodes; and the method further comprising the steps of:

marking one or more of the plurality of equivalence nodes; and selecting the additional materialized view from the marked equivalence nodes.

6. The method set forth in any of claims 1–3 further including the steps of:

determining which of a plurality of additional materialized views results in a lowest cost of incrementally maintaining the first materialized view; and creating the additional materialized view which results in the lowest cost.

7. The method set forth in claim 1 further comprising the step of:

employing the first materialized view to check an integrity constraint.

8. The method set forth in claim 2 wherein the step of using the expression directed acyclic graph to determine whether the first cost is less comprises the steps of:

identifying a subdag of the expression directed acyclic graph, the subdag containing a subdag node corresponding to the additional materialized view; and using the subdag to determine the first cost, the first cost comprising a sum of a cost of computing updates to the subdag node and a cost of performing updates to the subdag node.

9. The method set forth in claim 2 wherein the step of using the expression directed acyclic graph to determine whether the first cost is less comprises the steps of:

selecting an update track in the expression directed acyclic graph, the update track containing a plurality of nodes for propagating an update transaction to the first materialized view; and using the plurality of nodes for propagating to determine the first cost.

10. The method set forth in claim 9 wherein the step of using the plurality of nodes for propagating to determine the first cost comprises the steps of:

determining a cost of computing updates to the plurality of nodes for propagating; and determining a cost of performing updates to the plurality of nodes for propagating.

11. The method of claim 9 further comprising the step of determining which of the plurality of nodes for propagating corresponds to an additional materialized view which results in a lowest cost of incrementally maintaining the first materialized view.

12. The method set forth in claim 6 wherein the step of determining which results in a lowest cost comprises the steps of:

determining a third cost of computing updates to the first materialized view with the plurality of additional materialized views;

determining a fourth cost of performing updates to the first materialized view with the plurality of additional materialized views; and determining which of the plurality of additional materialized views results in a lowest total cost of incrementally maintaining the first materialized view, the lowest total cost comprising a sum of the third cost and the fourth cost.

13. The method set forth in claim 6 further including the steps of:

selecting an articulation node of the expression directed acyclic graph, the expression directed acyclic graph having a plurality of nodes, the plurality of nodes including the articulation node, a plurality of descendant nodes, and a plurality of remaining nodes, wherein the plurality of descendant nodes appear below the articulation node;

identifying a local expression directed acyclic graph comprising the articulation node and the plurality of descendant nodes;

using the local expression directed acyclic graph to determine a local cost of propagating updates to the first materialized view; and determining the first cost by combining the local cost with a cost of propagating updates via the plurality of remaining codes.

14. A method for repeatedly executing an ad-hoc query in a database, the method employing a materialized view of data to execute the ad-hoc query, the method comprising the steps of:

determining whether a first query cost of repeatedly executing the ad-hoc query with the materialized view is less than a second query cost of repeatedly executing the ad-hoc query without the materialized view; and creating the materialized view only if the first query cost is less than the second query cost.

15. The method set forth in claim 14 wherein the step of determining whether the first query cost is less comprises the steps of:

making an expression directed acyclic graph corresponding to the ad-hoc query; and using the expression directed acyclic graph corresponding to the ad-hoc query to determine whether the first query cost is less than the second query cost.

16. The method set forth in claim 15 wherein the step of using the expression directed acyclic graph corresponding to the ad-hoc query includes the steps of:

pruning the expression directed acyclic graph to produce a single expression tree corresponding to the ad-hoc query; and using the single expression tree corresponding to the ad-hoc query to determine whether the first query cost is less than the second query cost.

17. The method set forth in claim 15 wherein the step of making an expression directed acyclic graph corresponding to the ad-hoc query comprises the step of making an expression directed acyclic graph containing a plurality of equivalence nodes; and the method further comprising the steps of:

marking one or more of the plurality of equivalence nodes; and selecting the materialized view from the marked equivalence nodes.

18. The method set forth in claim 16 wherein the pruning step comprises the step of producing a single expression tree containing a plurality of equivalence nodes; and the method further comprising the steps of:

marking one or more of the plurality of equivalence nodes; and selecting the materialized view from the marked equivalence nodes.

19. The method set forth in any of claims 14–16 further including the steps of:

determining which of a plurality of materialized views results in a lowest cost of repeatedly executing the ad-hoc query; and creating the materialized view which results in the lowest cost.

20. The method set forth in claim 15 wherein the step of using the expression directed acyclic graph corresponding to the ad-hoc query comprises the steps of:

identifying a subdag of the expression directed acyclic graph, the subdag containing a subdag node corresponding to the materialized view; and using the subdag to determine the first query cost, the first query cost comprising a sum of a cost of computing updates to the subdag node and a cost of performing updates to the subdag node.

21. The method set forth in claim 15 wherein the step of using the expression directed acyclic graph corresponding to the ad-hoc query comprises the steps of:

selecting an update track in the expression directed acyclic graph, the update track containing a plurality of propagation nodes for updating the ad-hoc query; and using the plurality of propagation nodes to determine the first query cost.

22. The method set forth in claim 21 wherein the step of using the plurality of propagation nodes to determine the first query cost comprises the steps of:

determining a cost of computing updates to the plurality of propagation nodes; and determining a cost of performing updates to the plurality of propagation nodes.

23. The method of claim 21 further comprising the step of determining which of the plurality of propagation nodes corresponds to a materialized view which results in a lowest cost of repeatedly executing the ad-hoc query.

24. The method set forth in claim 19 wherein the step of determining which results in a lowest cost comprises the steps of:

determining a cost of computing updates to the ad-hoc query with the plurality of materialized views;

determining a cost of performing updates to the ad-hoc query with the plurality of materialized views;

determining which of the plurality of materialized views results in a lowest total cost of repeatedly executing the ad-hoc query, the lowest total cost comprising a sum of the cost of computing updates and the cost of performing updates.

25. The method set forth in claim 19 further including the steps of:

selecting an articulation node of the expression directed acyclic graph corresponding to the ad-hoc query, the expression directed acyclic graph having a plurality of nodes, the plurality of nodes including the articulation node, a plurality of descendant nodes, and a plurality of remaining nodes, wherein the plurality of descendant nodes appear below the articulation node;

identifying a second expression directed acyclic graph comprising the articulation node and the plurality of descendant nodes;

using the second expression directed acyclic graph to determine a local cost of propagating updates to the ad-hoc query; and determining the first query cost by combining the local cost with a cost of propagating updates via the plurality of remaining nodes.

* * * * *